April 26, 1927.
D. HINDAHL
1,625,998
DUMP CAR CONSTRUCTION
Original Filed May 3, 1922   2 Sheets-Sheet 1
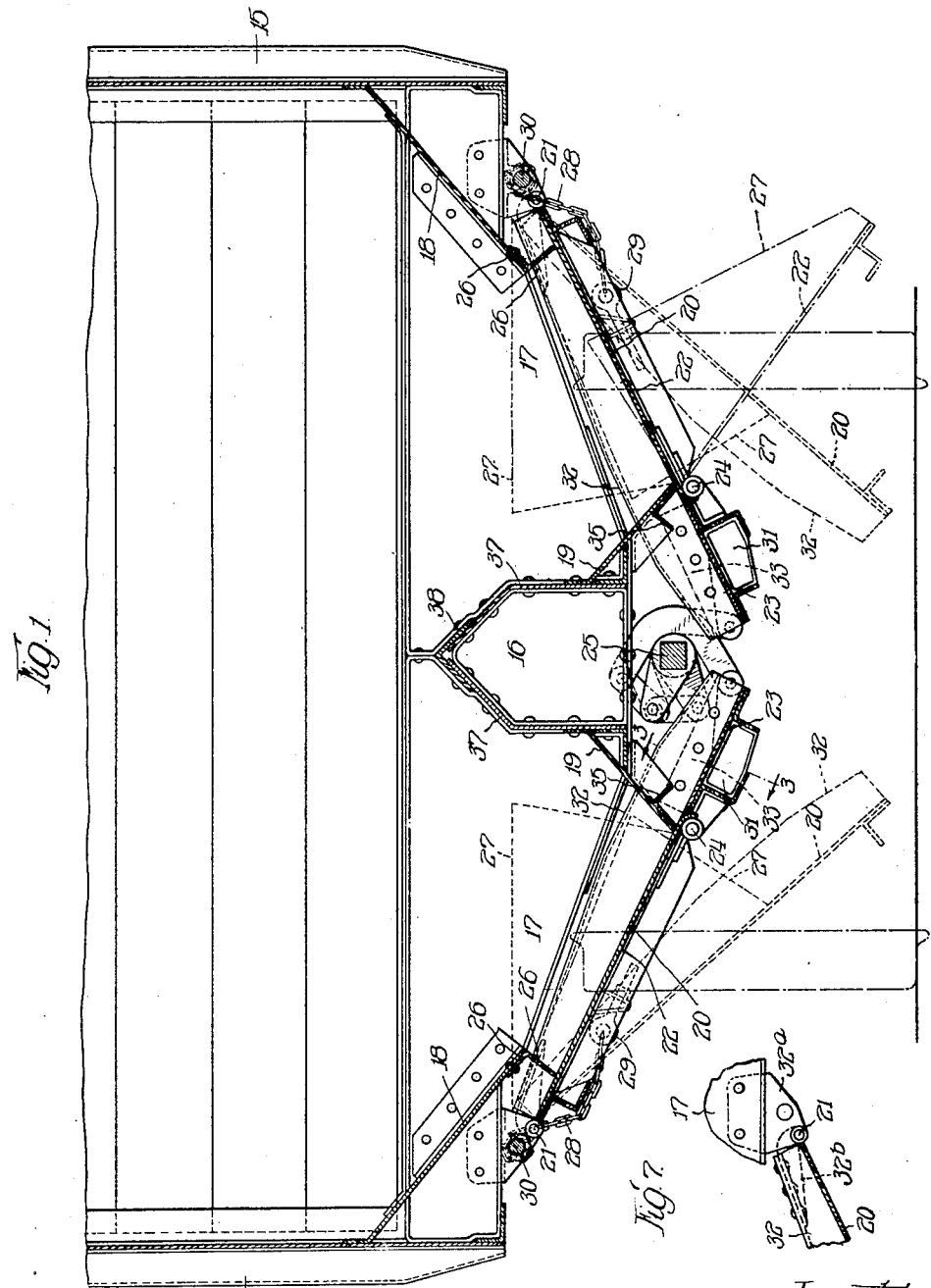
Witness:
R. Burkhardt
Inventor:
David Hindahl,
By Wilkinson, Huxley, Byron + Knight
Attys.

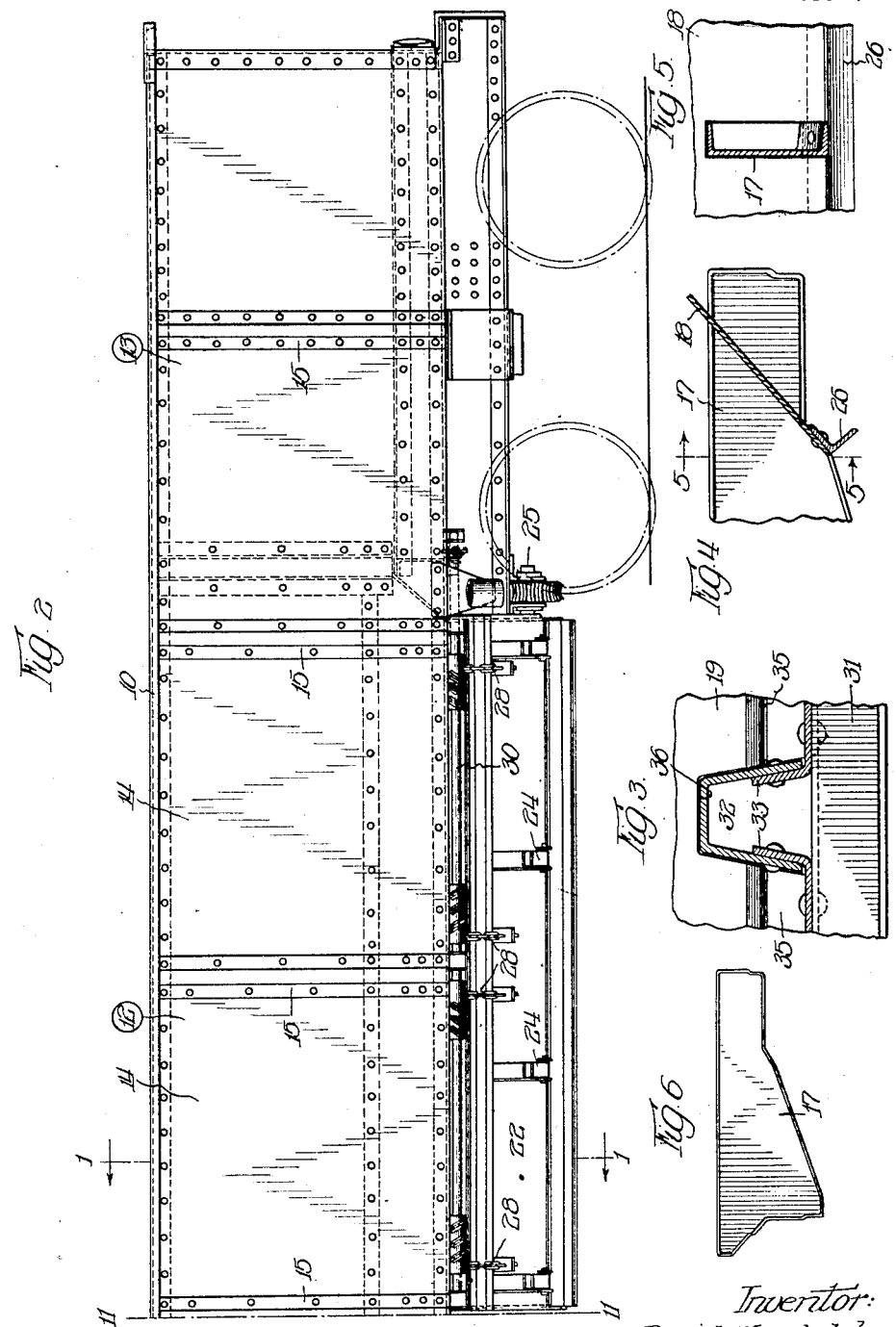

Patented Apr. 26, 1927.

1,625,998

UNITED STATES PATENT OFFICE.

DAVID HINDAHL, OF CHICAGO, ILLINOIS, ASSIGNOR TO RODGER BALLAST CAR COMPANY, OF CHICAGO, ILLINOIS, A CORPORATION OF MAINE.

DUMP-CAR CONSTRUCTION.

Application filed May 3, 1922, Serial No. 558,236. Renewed July 30, 1924.

The present invention relates to dump car construction.

An object of the present invention is to provide dump car construction which will be sturdy and which will be self-cleaning.

A further object is to provide dump car construction adapted for center dumping or side dumping in which there is small likelihood for interference between the parts of the mechanism for accomplishing said two operations.

A further object is to provide a dump car construction having a sturdy center sill which will not interfere with the complete dumping of the car.

A further object is to provide dump car construction having doors for center dumping, said doors being adaptable also for side dumping, parts being so arranged that there is very little tendency for material within the car to lodge within said parts to interfere with their proper operation.

Further objects will appear as the description proceeds.

Referring to the drawings—

Figure 1 is a cross sectional view taken along the plane of the line 1—1 of Figure 2;

Figure 2 is a view in side elevation of part of the railway dump car of the construction illustrated in Figure 1;

Figures 3, 4, 5, 6 and 7 are details of construction.

The numeral 10 indicates a railway dump car which may have the center line indicated by the numerals 11—11. Said car is provided with the middle dump portion 12 and the end flat portions 13—13 of which only one is indicated in Figure 2. The car is provided with the side plates 14—14, which may be stiffened by the vertically placed braces 15—15. The car is strengthened longitudinally by means of the center sill 16, said center sill being a fabricated structure which will be referred to more in detail hereinafter. Arranged transversely of the car at a plurality of points along the dumping portion of said car are the cross bearers 17—17, which cross bearers may be located in proximity to the braces 15—15. Said cross bearers 17—17 may be riveted to the center sill at the center of the car and to the side plates at the side of the car. The bottom of the dumping portion of the car may be made up as follows: Two inwardly sloping floor members 18—18 are provided which slope inwardly from the sides of the car. Attached to the center sill are the two outwardly sloping floor members 19—19. Cooperating with each sloping floor member 18 and the corresponding sloping floor member 19 is the swinging dump door 20 pivoted to swing about the pivot 21, said pivots 21 being located adjacent to the sloping floor members 18—18 and being supported from the cross bearers 17—17. Each of the dump doors comprises a closure member 22 and an extension member 23, said closure member 22 being pivoted to the extension member 23 about the pivot 24. A longitudinally extending rod 25 operates certain links or other mechanism to control the two dump doors 20—20, having operative connection with said dump doors at points adjacent to the extremities of the extensions 23. Operation of the longitudinally extending rod 25 will control the swinging movements of the dump doors 20—20 about the pivots 21—21, whereby material in the car may be dumped between the tracks upon which the car is operated. The construction for preventing the closure 22 and extension member 23 from jack-knifing downwardly under the load in the car will be referred to hereinafter.

The innermost edges of the sloping floor members 18—18 are provided with angle bars 26—26, each having one side contacting with a floor member 18 and a cross bearer 17, as will be presently described, and having its other side projecting at right angles to said floor member and forming part of the bottom of the car, closing the gap between said floor member and its adjacent closure member 22. Each of said closure members may be provided with side pieces 27—27 indicated in dotted lines in Figure 1, whereby each of said closure members forms a scoop.

As indicated above, each of the closure members 22 may have a pivotal movement about the pivot 24 as an axis, by which movement side dumping may be accomplished. Said closure 22 is controlled for side dumping by the chain or other flexible member 28, which may be connected to the closure 22 by means of the eye bolt 29. The other end of said chain 28 is controlled by the longitudinally extending shaft 30, which shaft may be operated by any preferred means. The pitch-line of the chain 28 should pass through the axis of pivot 21. By reason of this construction, swinging of the dump doors 20—20 for center dumping does not change the relation of the closure portion 22 to the remainder of said dump door. This advantage follows as a result of the fact that regardless of the swinging of the dump door 20 as a whole about the pivot 21, there is no change in the holding effect of chain 28, inasmuch as said chain merely swings with the remainder of the door about the pivot 21. The positions of the two dump doors 20—20 for center dumping are illustrated in broken lines in Figure 1. The position of the right hand closure member 22 for side dumping is indicated in dash and dot lines in Figure 1.

Each of the extension members 23 of the dump doors 20 is provided with strengthening means extending longitudinally of the car and indicated as a whole by the numeral 31. Each of the dump doors is provided with a strengthening rib extending in a plane transversely of the car, which rib is indicated by the numeral 32. Said rib in cross section may be in the form of an inverted, truncated V and is pivoted to have a swinging movement in the manner indicated in Figures 1 and 7 in which the numeral 32ª indicates casting members which may be secured to cross bearers 17 and which provide pivotal mounting means for an attachment piece 32ᵇ which is securely riveted to said rib 32. Said rib is fastened to the extension member 23 in the manner illustrated in Figure 3, which is a sectional view taken along the line 3—3 of Figure 1. Said extension member 23 is provided with two upturned portions 33—33, to the outer sides of which the strengthening rib 32 is riveted. The sturdy construction prevents the jack-knifing of closure 22 and extension member 23 under load. The bottom portion of each of the floor members 19—19 is provided with the strengthening bars 35, said floor member and said bars 35 being cut away as indicated by the numeral 36 to provide a recess for the strengthening rib 32. The wedge-shaped construction of the strengthening bar 32, which fits into the corresponding wedge-shaped recess 36 in the floor member 19, insures the wedging home of the dump door after operation in spite of distortions which may occur as a result of stresses in service. The angle bar 26 may be also cut away to provide a wedge-shaped recess to receive rib 32. By reason of the transverse recesses referred to and the fitting thereinto of the ribs 32, the car is strengthened against the racking strains due to heavy impacts. By reason of the fact that the upturned portions 33—33 of the dump door are mounted within the strengthening rib, said strengthening rib has a self-cleaning action.

As indicated in detail in Figures 4 and 5, the sloping floor members 18—18 are notched to receive the cross bearers 17—17. The sloping floor members 18—18 are braced by the angle bars 26 which are supported by the cross bearers 17—17.

The center sill 16 may be fabricated from structural steel and comprises the two side walls 37—37 which converge toward one another at their uppermost parts as indicated in Figure 1. Said walls 37—37 may be braced in any preferred way to prevent crushing together under load and may be provided at their upper converging portions with the angle bar 38 having its apex uppermost. As noted above, the cross bearers 17—17 will be riveted to the center sill 16 and will provide a sturdy connection between the center sill and the sides of the dump car. Said cross bearers also provide sturdy mounting members for the dump doors of the car. By reason of the wedge-shaped top of the center sill provided by the angle bar 38, said center sill is self-cleaning, whereby complete dumping may be readily effected.

It should be particularly noted that the structure described provides a very sturdy construction. The sloping walls 19 with their notches 36 which receive the wedge-shaped strengthening bars 32—32 insure a very rigid construction. This rigidity is improved by the side pieces 27—27 of the closure members 22—22. The fact that the wedge-shaped strengthening bars 32—32 fit within corresponding notches in the angle bars 26—26 also adds to the rigidity of the structure. The structure referred to, together with the fabricated center sill, provides a car which has ample strength to withstand all the shocks encountered in service. Expressed in other language, it may be stated that the underframe members of the car and the swinging dump doors have complementary recesses and projections which fit together when the doors are closed to give rigidity to the car structure.

As heretofore explained, the underframe of the car comprises the plurality of cross bearers 17 connected to the center sill and also connected to the side plates of the car in proximity to the braces or stakes 15. As indicated in Figure 1, the door 20 is located in a plane beneath the lower edge of the cross bearer 17, thus making it possible to extend the door 20 with its closure member 22 continuously as indicated in Figure 2 beneath the cross bearers.

One embodiment of the present invention has been described in detail. Many modifications of the disclosed embodiment will occur to those skilled in the art. It is intended in this patent to cover all such modifications that fall within the scope of the invention as defined by the appended claims.

I claim:

1. A dump car comprising a pair of bottom dump doors pivoted along axes adjacent to the sides of said car, sloping floor members located adjacent to the center line of said car and contacting with said dump doors along lines spaced from said center line, said doors having extension members extending beyond said spaced lines, said doors being provided with swinging closure members pivoted adjacent to said floor members, and flexible operating means for said closure members having their pitch lines always extending through the pivotal axes of said dump doors.

2. A dump car including dump doors for either side dumping or center dumping, each of said dump doors being of compound construction comprising a closure member and an extension member, said closure member being swingable outwardly relative to said extension member for side dumping, a flexible member for controlling said closure member for outside dumping, said flexible member having its pitch line always extending through the pivotal axis of its corresponding dump door.

3. A dump door comprising a closure member and an extension member, said members, being pivoted together, flexible controlling means for said closure member, the pitch line of said flexible means always extending through the pivotal axis of said dump door.

4. Dump car construction having on each side of its center line a pair of outer sloping floor members converging toward one another, a second pair of floor members, each of said outer floor members being spaced from one of said other floor members to provide an opening, a dump door pivoted adjacent to each of said outer floor members and each including a closure member for one of said openings, each of said dump doors having an extension member extending inwardly beyond its corresponding other floor member, said closure members being pivoted adjacent to said other floor members, and flexible operating means for said closure members, said flexible means having its pitch line always extending through pivotal axis of its corresponding dump door.

5. In dump car construction, a center sill, floor members adjacent to said center sill sloping downwardly and outwardly, floor members located adjacent to the sides of the car sloping downwardly and inwardly, and pivoted closures for connecting each pair of floor members, said closures having wedge-shaped bracing members adapted to fit into wedge-shaped openings in their corresponding floor members.

6. A dump car comprising side walls, sloping bottom members, a center sill, and cross bearer members connecting said side walls and said center sill, said bottom members being notched to receive said cross bearers.

7. A dump car comprising side walls, sloping bottom members, a center sill, and cross bearer members connecting said side walls and said center sill, said bottom members being notched to receive said cross bearers, longitudinal bracing members for said bottom members, said bracing members being rigidly connected to said cross bearer members.

8. A dump car comprising sloping bottom walls and dump doors cooperating therewith, said dump doors having wedge-shaped bracing members adapted to fit within wedge-shaped openings in said bottom walls whereby to wedge said dump doors into proper position regardless of distortions due to stresses encountered in service.

9. Dump car construction comprising a sloping bottom wall and a swinging dump door cooperating therewith, said dump door having upturned portions and wedge-shaped bracing means fitting over said upturned portions, said bracing member being adapted to fit within a corresponding recess in said sloping bottom wall.

10. A dump car having a pair of transversely spaced dumping openings, a pair of swinging dump doors for closing said openings, said dump doors being pivoted along longitudinal axes placed adjacent to the sides of said car, each of said dump doors comprising a closure member and an extension member, said closure member having pivotal connection with said extension member for side dumping, operating means for said dump doors connected to the outer ends of said extension member, each of said closure members and each of said extension members being provided with bracing means for preventing jack-knifing of said dump doors under load.

11. A dump car having a pair of transversely spaced dumping openings, a pair of swinging dump doors for closing said openings, said dump doors being pivoted along longitudinal axes placed adjacent to the sides of said car, each of said dump doors comprising a closure member and an extension member, said closure member having pivotal connection with said extension member for side dumping, operating means for said dump doors connected to the outer ends of said extension members, each of said closure members and each of said extension members being provided with bracing means for preventing jack-knifing of said dump doors under load, said bracing means being wedge-shaped to conform to corresponding recesses in the bottom portion of said car to insure the proper location of said dump doors regardless of distortions due to stresses encountered in service.

12. A dump car including a dump door pivoted about a longitudinal axis, said dump door being of compound construction and including a closure member and an extension member, supporting means for said dump door applied to the outer end of said closure member, said closure member being pivoted to said extension member, said extension member and closure member being provided with bracing means to prevent jack-knifing of said door under load.

13. A dump car including a dump door pivoted about a longitudinal axis, said dump door being of compound construction and including a closure member and an extension member, supporting means for said dump door applied to the outer end of said closure member, said closure member being pivoted to said extension member, said extension member and closure member being provided with bracing means to prevent jack-knifing of said door under load, said bracing means being wedge-shaped to conform to a corresponding recess in the bottom of said car whereby to wedge said dump doors into proper position regardless of distortions due to stresses encountered in service.

14. A railway car having a bottom comprising a dump door, a hinge member therefor, said dump door including a closure member pivotally mounted thereon opposite the hinge member of the door, flexible means controlling said closure member, the pitch line of said flexible means always extending through the pivotal axis of said dump door.

15. A dump car, including a center sill having an A-shaped apex, floor members connected with said center sill and sloping downwardly and outwardly therefrom, sloping floor members adjacent to the sides of said car, the two floor members on each side of said center sill converging toward one another, and a pair of swinging dump doors, each having a wedge-shaped reinforcing member on the upper side thereof, said wedge-shaped reinforcing members being adapted to fit into corresponding notches in their corresponding outwardly sloping floor members.

16. A dump car, including a center sill having an A-shaped apex, floor members connected with said center sill and sloping downwardly and outwardly therefrom, sloping floor members adjacent to the sides of said car, the two floor members on each side of said center sill converging toward one another, and a pair of swinging dump doors, each having a wedge-shaped reinforcing member on the upper side thereof, said wedge-shaped reinforcing members being adapted to fit into corresponding notches in their corresponding outwardly sloping floor members, each of said dump doors being provided with swinging closure members pivoted adjacent to said outwardly sloping floor members.

17. A dump car, including a center sill having an A-shaped apex, floor members connected with said center sill and sloping downwardly and outwardly therefrom, sloping floor members adjacent to the sides of said car, the two floor members on each side of said center sill converging toward one another, and a pair of swinging dump doors, each having a wedge-shaped reinforcing member on the upper side thereof, said wedge-shaped reinforcing members being adapted to fit into corresponding notches in their corresponding outwardly sloping floor members, each of said dump doors being provided with swinging closure members pivoted adjacent to said outwardly sloping floor members, said closure members having side pieces for strengthening purposes and to form a scoop.

18. A dump car having a center sill and a pair of floor members on the opposite sides of said center sill, the members of each pair of floor members converging toward one another, and a dump door pivoted adjacent to one of said floor members and co-operating with the other of said floor members to form a seal, said dump door being provided with a wedge-shaped reinforcing member on its upper side adapted to fit into a corresponding wedge-shaped notch in a corresponding sloping floor member.

19. A car of the class described having underframe members, a bottom for said car comprising swinging door members, transverse recesses upon one of the members and corresponding projections upon the other members engaging the recessed members to give rigidity to the car structure.

20. A car of the class described having underframe members, a bottom comprising door members, transverse recesses formed in the underframe members and corresponding projections upon the door members swinging into engagement with said recessed members when the doors are closed.

21. A car of the class described having underframe members, a bottom comprising door members, transverse recesses formed in the underframe members and corresponding projections upon the door members swinging into engagement with the wedge-shaped recessed members when the doors are closed.

22. A car of the class described having an underframe comprising a center sill and cross sills extending from the center sill toward the side of the car, dumping doors located under said cross sills and extending continuously beneath said cross sills, said dumping doors being arranged to discharge the car lading either to the center or to the side of the track and means for operating said doors.

23. A car of the class described having an underframe comprising a center sill and cross members, a bottom for said car comprising a swinging door frame hinged adjacent to the car side, and a door within said frame hinged adjacent to the center sill, said door frame and its door extending continuously beneath the cross members of the underframe.

24. A car of the class described having an underframe comprising a center sill and cross members, a bottom comprising swinging door frames hinged adjacent to the car sides, and a door within each of said frames hinged adjacent to the center sill, said door frames and their doors extending continuously beneath the cross members of the underframe, means for simultaneously operating said door frames to drop downwardly for center dumping, and independent means for operating each door within said frames for side dumping.

25. A car of the class described having an underframe comprising a center sill and sides, cross members extending from the center sill towards the sides of the car, a bottom for said car comprising a swinging dumping member located below the cross members, said dumping member extending continuously beneath said cross members, said under frame and said dumping member having corresponding recesses and projections which fit together when said dumping member is in closed position.

Signed at Chicago, Illinois, this 6th day of April, 1922.

DAVID HINDAHL.